(12) United States Patent
Chung et al.

(10) Patent No.: US 12,099,216 B2
(45) Date of Patent: Sep. 24, 2024

(54) SURFACE LIGHT SOURCE PROJECTION DEVICE

(71) Applicant: Guangzhou Tyrafos Semiconductor Technologies Co., Ltd., Guangzhou (CN)

(72) Inventors: Jun-Wen Chung, Tainan (TW); Hsu-Wen Fu, Kaohsiung (TW); Lu-Lang Hsu, Hsinchu County (TW)

(73) Assignee: Guangzhou Tyrafos Semiconductor Tech. Co., Ltd., Guangzhou (CN)

( * ) Notice: Subject to any disclaimer, the term of this patent is extended or adjusted under 35 U.S.C. 154(b) by 315 days.

(21) Appl. No.: 17/730,192

(22) Filed: Apr. 27, 2022

(65) Prior Publication Data
US 2023/0244008 A1    Aug. 3, 2023

(30) Foreign Application Priority Data
Jan. 28, 2022 (TW) .................... 111103827

(51) Int. Cl.
*G02B 5/02* (2006.01)
*G02B 27/42* (2006.01)

(52) U.S. Cl.
CPC ......... *G02B 5/0231* (2013.01); *G02B 5/0252* (2013.01); *G02B 27/4272* (2013.01)

(58) Field of Classification Search
CPC . G02B 5/0231; G02B 5/0252; G02B 27/4272
USPC .......................................................... 359/756
See application file for complete search history.

(56) References Cited

U.S. PATENT DOCUMENTS

2010/0302803 A1* 12/2010 Bita ..................... G02B 6/0036
                                                                    362/612
2021/0173222 A1*  6/2021 Makinen ............ G02B 27/0081

* cited by examiner

*Primary Examiner* — Wyatt A Stoffa
*Assistant Examiner* — Mitchell T Oestreich
(74) *Attorney, Agent, or Firm* — Lin & Associates Intellectual Property, Inc.

(57) ABSTRACT

The present invention provides a surface light source projection device, which includes a light emitting module and a diffractive optical module. Wherein, the diffractive optical module has two micron diffractive layers, the micron diffractive layers include a plurality of micron structures, and the shape of the micron structures is set to be cone, disc or any combination of the above. The micron structures have an outer diameter, and the outer diameter of the micron structures is between 5 times and 200 times of the incident wavelength of the light beam output from the light emitting module. Thereby, the surface light source projection device capable of enduring heat accumulation generated after continuous irradiation of high-energy laser is provided to facilitate long-term irradiation and long-distance sensing.

9 Claims, 10 Drawing Sheets

SURFACE LIGHT SOURCE PROJECTION DEVICE

CROSS-REFERENCE TO RELATED APPLICATION

This application claims the priority of Taiwanese patent application No. 111103827, filed on Jan. 28, 2022, which is incorporated herewith by reference.

BACKGROUND OF THE INVENTION

1. Field of the Invention

The present invention relates generally to a surface light source projection device, applicable to a Time-of-Flight (ToF) device, and more particularly, to provide a surface light source projection device comprising a micron diffractive layer having a plurality of micron structures.

2. The Prior Arts

In recent years, with the evolution of the electronic industry and the vigorous development of industrial technologies, various electronic devices are developed and designed in the trend of light-weight and high portability, so that users can carry out mobile business or enjoy entertainment anytime and anywhere. Among all those products, 3D sensing technology is gradually driving the trend due to the successful application of interactive game consoles, and 3D sensing technology can also be applied to close-range face or object recognition, medium-distance AR/VR applications, building indoor detection and the optical radar, and long-distance object telemetry required for autonomous driving, which has led to the vigorous development of various 3D sensing technologies. The currently well-known 3D technologies are stereo vision sensing, time-of-flight ranging sensing, and structured light sensing measurements.

The time-of-flight ranging sensing technology is to obtain a plurality of distance distributions through the time difference between the emission time of the light source and the time of receiving the feedback light to establish a three-dimensional scanning result. At present, the mainstream emission light sources on the market for time-of-flight ranging sensing technology can be divided into collimated light systems and surface light source systems, for example, Vertical Cavity Surface Emitting Laser (VCSEL). Because the collimated light system consists of a light source that forms collimated light through a light collimating lens set consisting of at least two lenses, and then projects hundreds to tens of thousands of light spots through diffractive elements, and finally the luminous power is proportional to the relationship, the collimated light system is suitable for all applications ranging from short-distance to long-distance. However, this will increase the thickness of the surface light source projection device and is not beneficial for the thinning of mobile devices; on the other hand, the use of surface light source systems is more suitable for mobile devices, however, with projection distance limited by its luminous power, the surface light source system is only limited to short and medium distance applications.

However, the light emitted by the surface light source projection device needs to be diffused and scattered by a diffusing sheet or a diffractive sheet to increase the angular range of light projection to cover the field of view of the three-dimensional scanning device. As the current diffuser or diffractive film is made of polymer material embossing, when used in conjunction with the laser light source in the surface light source projection device, there is a problem of heat accumulation, especially in some special environments that need to use short-wavelength lasers (e.g., blue lasers or violet lasers) because polymer materials are more likely to absorb these wavelengths, causing deterioration and deformation of the material structure, which are the shortcomings of light diffusion or light diffraction. Also, the light energy is strong, and if the light is continuously irradiated on the plastic structure, it may cause risks such as thermal accumulation and fire of the plastic structure, and these problems are difficult to prevent and monitor through changes in physical properties. Therefore, how to provide a stable, safe and effective beam diffusing sheet diffuser or diffractive elements is an urgent problem to be solved.

However, by using the diffuser, although a beam of light can be projected uniformly and the collimation requirement of the light source is not high, there are three problems when in use. First, it will destroy the polarization of light; second, the use efficiency of light is poor; and, third, it will destroy the directivity of light; therefore, the diffuser is only suitable for short and medium distance projection and general sensing. On the other hand, the diffractive element projects a beam of light into hundreds to tens of thousands of spots, so the light source of the diffractive element has high collimation requirement, and a poorly designed diffractive element will have serious zero-order light spot. However, the diffractive element still has the advantages of high utilization efficiency of light and can maintain the polarization and directivity of light, so it is more suitable for short-to-long-distance sensing and helps to maintain light polarization.

In view of the above shortcomings, the present invention is devised to address these shortcomings.

SUMMARY OF THE INVENTION

A primary objective of the present invention is to provide a surface light source projection device, which has a diffractive optical module, and the diffractive optical module has a two micron diffractive layers, and the micron diffractive layers include a plurality of micron structures, wherein the outer diameter of the micron structures is set to be between 5 times and 200 times of the incident wavelength of the beam emitted by the light emitting module, so that the diffracted light generated by the beam passing through the diffractive optical module can realize a diffraction pattern with high-density dot matrix and low zero-order diffraction intensity, whereby the present invention provides a surface light source projection device suitable for time-of-flight ranging sensing technology and resistant to heat accumulation after irradiation by high-energy lasers, which is useful for long-term irradiation and long-distance sensing, and also suitable for image sensing in special environments where short-wavelength laser irradiation is resistant to light degradation.

In order to achieve the above objective, the present invention provides a surface light source projection device, comprising: a diffractive optical module, having a light incident surface and a light emitting surface, and the diffractive optical module being provided with two micron diffractive layers; a light emitting module, used to output a beam with collimation, the beam having an incident wavelength, and the beam being incident on the light incident surface of the diffractive optical module, and outputting a diffracted light from the light emitting surface after passing through the diffractive optical module; wherein, the micron diffractive layers comprising a plurality of micron structures, and the shapes of the micron structures are set as cones, discs or any combination of the above, and the micron structures have an outer diameter between 5 times and 200 times the incident wavelength of the incident wavelength, which affects the size of diffraction spots.

Preferably, according to the diffractive optical module of the surface light source projection device of the present invention, the height of the micron structures is between 0.05 times and 0.2 times the outer diameter.

Preferably, according to the diffractive optical module of the surface light source projection device of the present invention, the spacing between neighboring micron structures is between 0.5 times and 5 times the outer diameter.

Preferably, according to the diffractive optical module of the surface light source projection device of the present invention, the surface roughness (Ra) of the micron structures is between 0.5 nm and 50 nm.

Preferably, according to the surface light source projection device of the present invention, the micron diffractive layers are respectively a first micron diffractive layer and a second micron diffractive layer.

Preferably, according to the surface light source projection device of the present invention, the first micron diffractive layer is arranged on the light incident surface of the diffractive optical module, and the second micron diffractive layer is arranged on the light emitting surface of the diffractive optical module.

Preferably, according to the surface light source projection device of the present invention, the diffractive optical module comprises: a first diffractive optical element, having a first upper surface and a first lower surface; and a second diffractive optical element, having a second upper surface and a second lower surface; wherein, the first micron diffractive layer is disposed on the first upper surface of the first diffractive optical element, the second micron diffractive layer is disposed on the second diffractive optical element, the light beam is incident on the diffractive optical module from the first lower surface, and passes through the diffractive optical module to be outputted as the diffracted light from the second upper surface.

Preferably, according to the surface light source projection device of the present invention, the second micron diffractive layer is disposed on the second lower surface.

Preferably, according to the surface light source projection device of the present invention, the second micron diffractive layer is disposed on the second upper surface.

Preferably, according to the surface light source projection device of the present invention, the first micron diffractive layer has a first direction, and the first direction is parallel to a dimension of the first micron diffractive layer; the second micron diffractive layer has a second direction, the second direction is parallel to a dimension of the second micron diffractive layer; the first direction and the second direction form a relative angle, and the relative angle is between 5 degrees and 90 degrees.

Preferably, according to the surface light source projection device of the present invention, the relative angle is between 19-21 degrees, with a cycle of 60 degrees.

Preferably, according to the surface light source projection device of the present invention, the micron structures of the micron diffractive layer are arranged in a most densely arranged hexagonal structure.

Preferably, according to the surface light source projection device of the present invention, the micron diffractive layers are respectively disposed on the light incident surface and the light emitting surface of the diffractive optical module.

Preferably, according to the surface light source projection device of the present invention, the diffractive optical module further comprises a substrate, and the substrate, the micron diffractive layers, and the micron structures are formed by dry etching, the material of the diffractive optical module is transparent crystal or glass.

The surface light source projection device provided by the present invention mainly utilizes the micron structure of the two micron diffractive layers with the outer diameter between 5 times and 200 times the incident wavelength of the light beam of the light emitting module, so that the light beam passes through the diffractive optical module to generate diffracted light with a high-density dot matrix. Furthermore, by adjusting the range of height to control the light intensity and zero-order diffraction intensity of the diffracted light spots, adjusting the range of spacing to control the distance and range of the light spots, and adjusting the range of surface roughness to control the efficiency of light use and zero order diffraction intensity, so that the diffracted light generated by the light beam passing through the diffractive optical module realizes a diffraction pattern with a high density of dot matrix and low zero order diffraction intensity. In addition, the two micron diffractive layers of the present invention are formed by dry etching, and the material of the diffractive optical module is transparent crystal or glass, so that the present invention provides a surface light source projection device suitable for the time-of-flight ranging sensing technology and resistant to heat accumulation after high-energy laser irradiation, to facilitate long-term irradiation and long-distance sensing, and also suitable for image sensing in special environments where short-wavelength laser irradiation is resistant to photo-degradation, thereby, achieving wide applicability and high stability.

In order to make those skilled in the art understand the purpose, features and effects of the present invention, the present invention is described in detail as follows by means of the following specific embodiments and in conjunction with the accompanying drawings.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
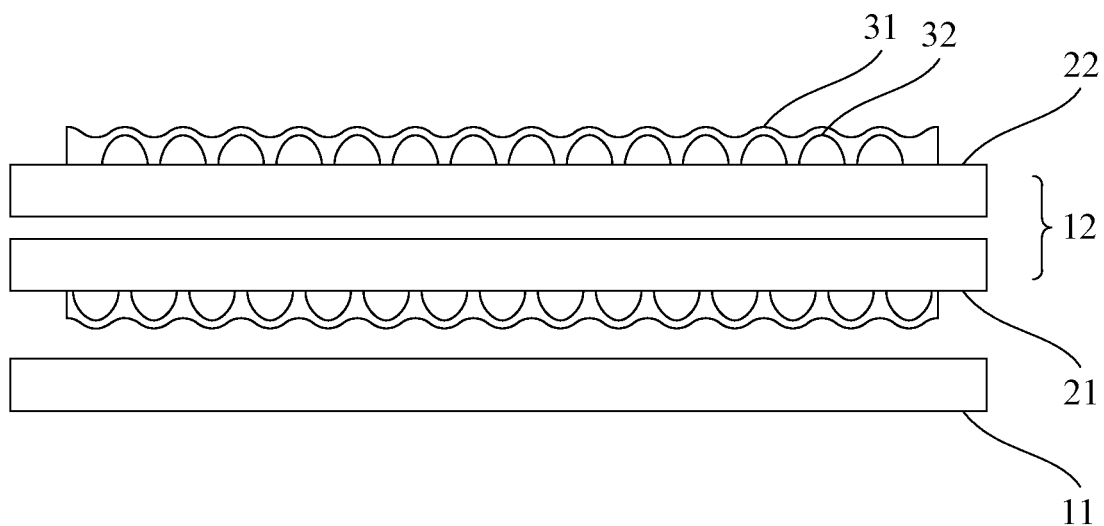
FIG. 1 is a schematic view of a surface light source projection device according to the present invention.

Refer to FIG. 1, which is a schematic view of a surface light source projection device according to the present invention. As shown in FIG. 1, the surface light source projection device 100 according to the present invention includes a light emitting module 11 and a diffractive optical module 12.

Figure 2:
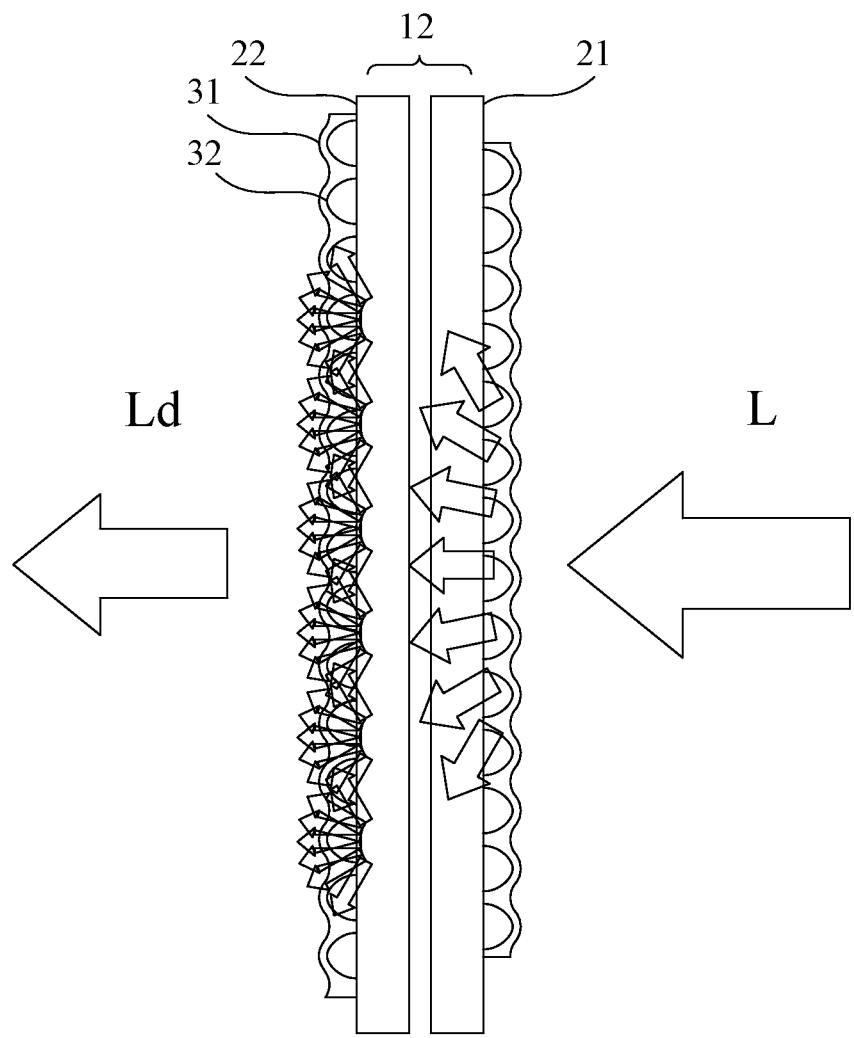
FIG. 2 is a schematic view illustrating that the light emitting module according to the present invention emitting incident light to the diffractive optical module.

Also refer to FIG. 2. FIG. 2 is a schematic view illustrating that the light emitting module according to the present invention emitting an incident light to the diffractive optical module. As shown in FIG. 2, the light emitting module 11 of the present invention is used to output a light beam L, the light beam L has a specific narrow half-width incident wavelength (not shown), and the light beam L can be highly directional beam. In some embodiments, the light emitting module 11 may be a vertical-cavity surface-emitting laser (VCSEL) module capable of emitting multiple beams simultaneously. In other embodiments, the light emitting module 11 may also be an edge-emitting laser diode module capable of emitting a single beam, a collimated light emitting diode (LED) module or other suitable light sources, and the number of light sources may be one or more, but the present invention is not limited thereto.

Figure 3:
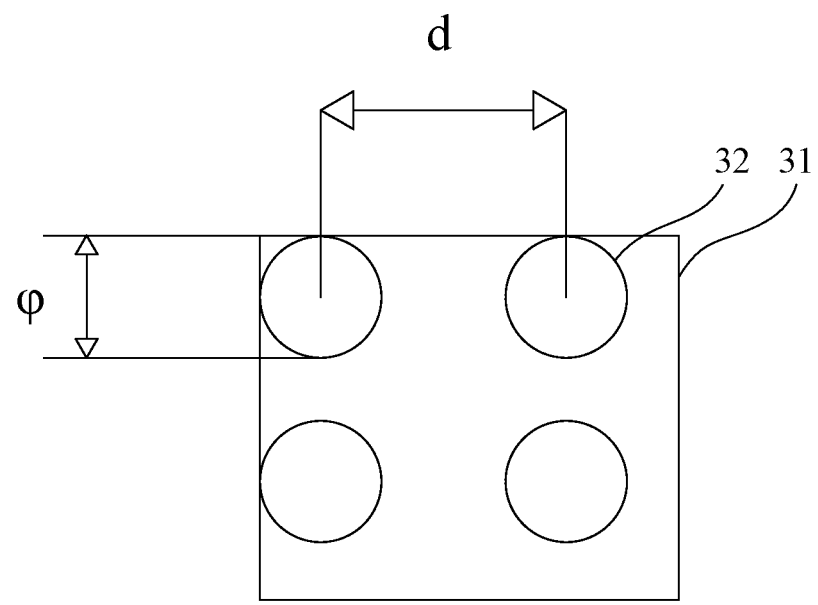
FIG. 3 is a schematic view of a micron diffractive layer according to the present invention.

Refer to FIG. 2 and FIG. 3. FIG. 3 is a schematic view of a micron diffractive layer according to the present invention. The diffractive optical module 12 of the present invention is used for the light beam L to pass through to form the diffracted light Ld projected outward. The diffractive optical module 12 has a light incident surface 21 and a light emitting surface 22. The light incident surface is used to receive the light beam L, and the light emitting surface 22 is used to output the diffracted light Ld, wherein the diffractive optical module 12 has two micron diffractive layers 31, and the micron diffractive layers 31 comprise a plurality of micron structures 32. The outer diameter $\phi$ of the micron structures 32 is between 5 times and 200 times the incident wavelength of the light beam L. It should be further explained that the outer diameter $\phi$ of the micron structures 32 can be used by the user to adjust the spot density of the diffraction pattern formed by the diffracted light Ld. When the outer diameter $\phi$ is larger, the diffraction pattern formed by the diffracted light Ld has a lower pot density. The advantage is that the diffraction pattern formed by the diffracted light Ld has a larger range, and 3D sensing can be realized by the surface light source projection device 100 with a smaller size. However, the disadvantage is that it is difficult to achieve a far distance sensing when the spot density is low. On the other hand, when the outer diameter $\phi$ is smaller, the diffraction pattern formed by the diffracted light Ld has a higher spot density. If the outer diameter $\phi$ is too small, the range of the generated diffraction pattern will be too small, making it difficult to reduce the size of the surface light source projection device 100, which does not meet practical application requirements.

Thereby, the surface light source projection device 100 of the present invention utilizes the diffractive optical module 12 to convert the original light beam L into the diffracted light Ld, and in combination with setting the outer diameter $\phi$ of the micron structure 32 to between 5 times and 200 times the incident wavelength of the beam L, to achieve a diffraction pattern with a high-density dot matrix. The light spot of the diffraction pattern has the advantages of uniform light intensity and high density, to achieve the effect of long-distance sensing.

It is worth noting that the diffractive optical module 12 of the present invention must have two micron diffractive layers 31, and the reason is that when only a single micron diffractive layer is used as the diffractive optical module 12, the spot density of the diffraction pattern formed by the diffracted light Ld on the small-sized surface light source projection device 100 is insufficient to cover a large-area projection range, and as aforementioned, it is difficult to realize long-distance sensing when the spot density is low. It also causes a significant drop in the accuracy of long-distance sensing. Therefore, in the present invention, the diffracted light Ld forms a diffraction pattern with a high-density dot matrix by using the two micron diffractive layers 31. It should be noted that the number of the diffractive layers 31 is not limited to two layers, and the aforementioned actual manufacturing process is only used for illustration and is not intended to limit the present invention.

Specifically, in some embodiments, the shape of the micron structures 32 of the present invention can be configured as a cone, a disc, or a combination of any of the above. It should be further explained that the outer diameter $\phi$ referred to in the present disclosure can be a representation of the width of any micron structure 32. When the micron structure 32 is disc-shaped, the outer diameter $\phi$ can be the outer diameter $\phi$ of the micron structure 32; when the micron structure 32 is not disc-shaped, the outer diameter $\phi$ can be represented by the outer diameter of the cylindrical structure closest to the micron structure 32, but the invention is not limited thereto.

Specifically, in some embodiments, the heights of the micron structures 32 are between 0.05 and 0.2 times the outer diameter $\phi$. It should be further explained that the height of the micron structure 32 can be used by the user to adjust the light intensity uniformity of the light spot of the diffraction pattern formed by the diffracted light Ld. The reason is that the combination of the heights of the micron structures 32 and the outer diameter $\phi$ will affect the diffraction factor and interference factor of the diffracted light Ld, so that the light intensity uniformity of the light spot of the diffraction pattern will change. It can be understood that, when the height of the micron structure 32 is too small, the diffracted light Ld cannot be formed after the light beam L passes through the diffractive optical module 12. In addition, in the actual manufacturing process, the higher the height of the micron structures 32 is, the uniformity of the crystals of the micron structures 32 will also decrease, thereby further affecting the light intensity uniformity of the light spot of the diffraction pattern formed by the diffracted light Ld. It should be noted that the aforementioned actual manufacturing process is only used for illustration, and is not used to limit the present invention.

Specifically, in some embodiments, the spacing between neighboring micron structures 32 can be adjusted by the user to adjust the range of the diffraction pattern formed by the diffracted light Ld. The larger the spacing is, the larger the range of the diffraction pattern formed by the incident light Ld. On the other hand, when the spacing is smaller, the smaller the range of the diffraction pattern formed by the diffracted light Ld. It can be understood that, according to the needs, users can choose which spacing is more appropriate to be used with the outer diameter φ of the aforementioned micron structures 32. It is worth noting that, in a preferred embodiment of the present invention, the spacing between neighboring micron structures 32 must be between 0.5 times and 5 times the outer diameter φ. When the spacing between the micron structures is less than 0.5 times of φ, the range of the diffraction pattern formed by the diffracted light Ld will be too small, which does not meet the needs of practical applications. On the other hand, when the spacing is increased in order to improve the range of the diffraction pattern formed by the diffracted light Ld, the light beam L cannot form the diffracted light Ld after passing through the diffractive optical module 12 since the outer diameter φ is too small.

Specifically, in some embodiments, the surface roughness (Ra) of the micron structures 32 will affect the zero-order diffraction intensity of the diffraction pattern formed by the diffracted light Ld and the light use efficiency; wherein, when Ra is larger, the use efficiency of light will become worse, and the zero-order diffraction intensity will become weaker, even lower than the first-order diffraction intensity. On the other hand, when Ra is smaller, the use efficiency of light will be higher and the stronger the diffraction intensity of the first order will be. It can be understood that the user can choose which spacing to use with the surface roughness Ra of the micron structure 32 according to application needs. It is worth noting that, in a preferred embodiment of the present invention, the surface roughness Ra of the micron structure 32 must be between 0.5 nm and 50 nm. The reason is that when the Ra of the micron structure 32 is less than 0.5 nm, the zero-order diffraction will be too strong, which does not meet the needs of practical applications. On the other hand, when Ra is increased to reduce the zero-order diffraction intensity formed by the diffracted light Ld to exceed 50 nm, the effective utilization rate of the light beam L after passing through the diffractive optical module 12 is low, and the intensity of the diffraction spot is insufficient.

Thereby, the surface light source projection device 100 of the present invention, by adjusting the height and spacing of the micron structures 32, further enhances the intensity uniformity and the spot density of the diffraction pattern formed by the diffracted light Ld and improves the stability and accuracy of long-distance sensing to realize a dot matrix diffraction pattern with a wide range and high uniformity of light intensity. Also, the micron structure 32 has good optical properties to meet practical application requirements.

It is worth noting that, in some embodiments, the micron structures 32 of the micron diffractive layer 31 according to the present invention are arranged in a most densely arranged hexagonal structure, and the most densely arranged hexagonal structure is an arrangement with the highest space utilization rate. As such, by arranging the micron structures 32 in the most densely arranged hexagonal structure, the spot density of the diffraction pattern formed by the diffracted light Ld is further increased, and the accuracy of long-distance sensing is greatly improved, but the present invention is not limited thereto.

Specifically, the micron structure 32 of the micron diffractive layer 31 of the present invention can be formed from a single material by dry etching, so that the appearance and shape of the micron structure 32 can be effectively controlled. Compared with the prior art wherein the optical structure is formed of organic materials, the micron structures 32 of the embodiments of the present invention are not prone to cracking, and are also resistant to physical friction, so the micron diffractive layer 31 can have stable optical properties. Moreover, in some embodiments, the material of the micron diffractive layer 31 may include transparent crystal or glass, such as sapphire or quartz. Specifically, sapphire has properties such as high hardness, high melting point, and high refractive index. The Mohs hardness of sapphire is 9, which is a material with high hardness and wear resistance, so the micron structure 32 of the micron diffractive layer 31 is not easily damaged. Furthermore, the melting point of sapphire is higher than 2000 degrees Celsius and has good thermal conductivity; therefore, the sapphire is not easily deformed even under irradiation by a light source for a long time, which helps the micron diffractive layer 31 to maintain stable optical properties. In addition, since the lattice stacking of sapphire is also a hexagonal system, in some embodiments, the sapphire can be used with the micron structures 32 with the most densely arranged hexagonal structure to further enhance the light spot of the diffraction pattern formed by the diffracted light Ld density; however the present invention is not limited thereto.

Specifically, in some embodiments, the micron diffractive layer 31 may be disposed on the light incident surface 21 and the light emitting surface 22 of the diffractive optical module 12, respectively. In other embodiments, the diffractive optical module 12 may further include a first diffractive optical element and a second diffractive optical element, wherein the first diffractive optical element is provided with a first micron diffractive layer, and the second diffractive optical element is provided with a second micron diffractive layer. As such, through the arrangement of the double-layer optical elements, the user can adjust the angle between the optical elements according to the application needs, so as to control the diffraction pattern and the spot density formed by the diffracted light Ld, and greatly improve the applicability of the surface light source projection device 100 of the present invention, but the present invention is not limited thereto.

Accordingly, the present invention further improves the spot density of the diffraction pattern formed by the diffracted light Ld by adjusting the arrangement of the micron structures 32 of the micron diffractive layer 31, thereby greatly improving the accuracy of long-distance sensing, while at the same time, the arrangement of the double-layer optical elements makes the present invention have wide applicability.

First Embodiment

Hereinafter, an embodiment of the first embodiment of the surface light source projection device 100 of the present invention will be described with reference to the drawings.

Figure 4:
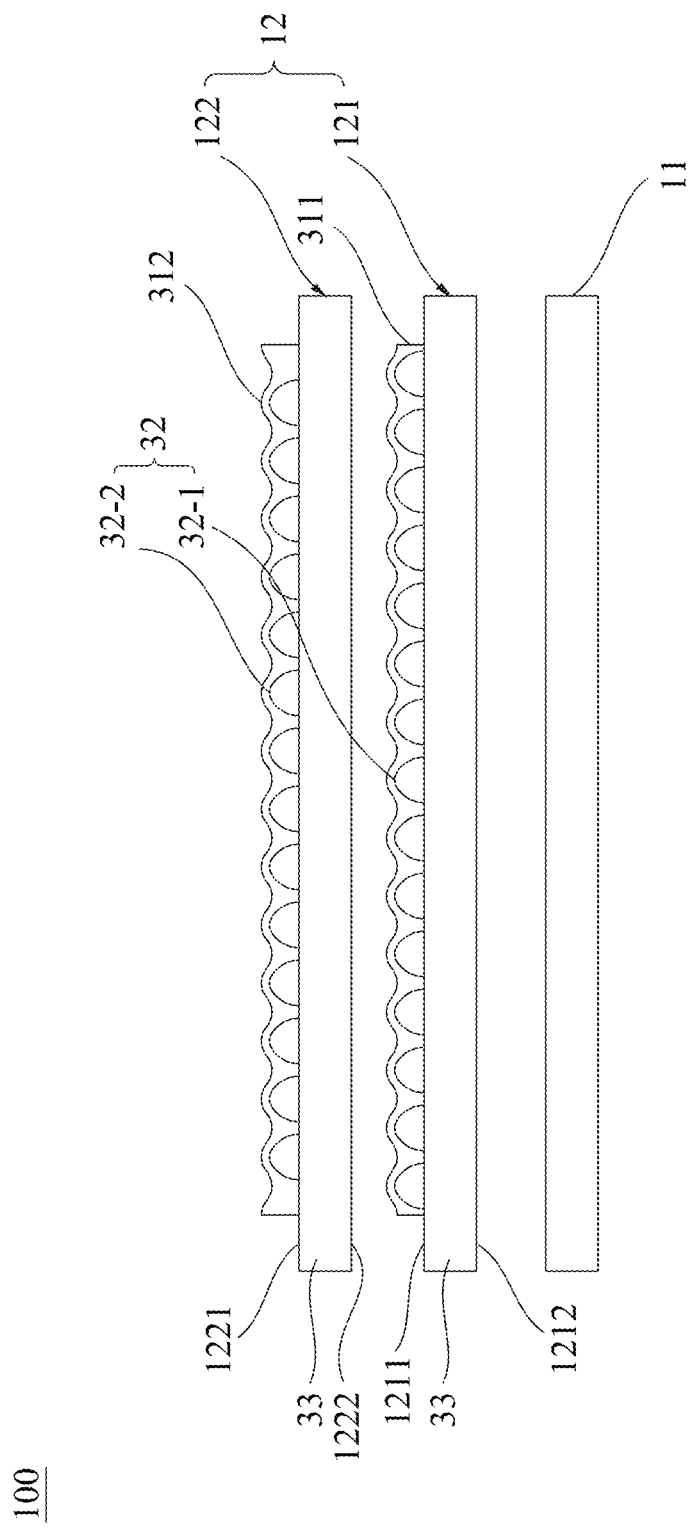
FIG. 4 is a schematic view of a surface light source projection device according to the first embodiment of the present invention.
Figure 5:
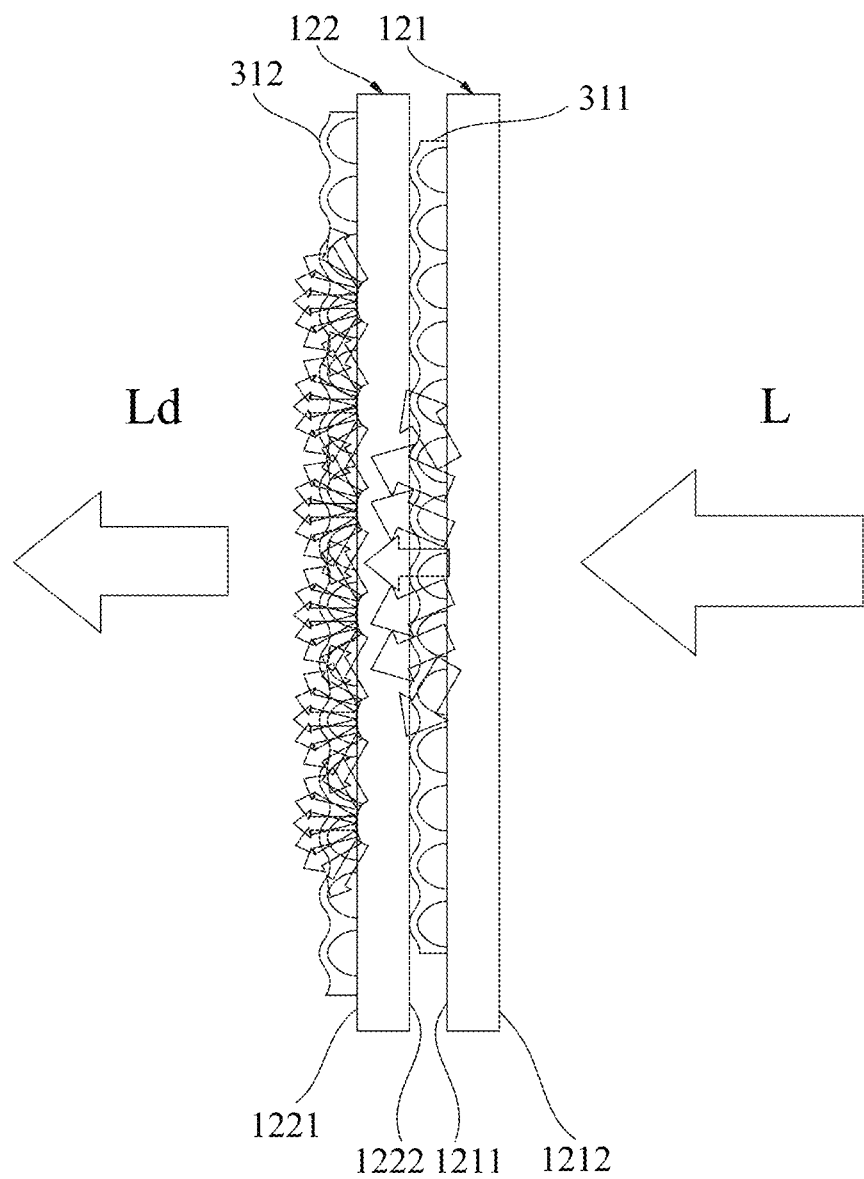
FIG. 5 is a schematic view of a diffractive optical module according to the first embodiment of the present invention.

Refer to FIG. 4 and FIG. 5. FIG. 4 is a schematic view of a surface light source projection device according to a first embodiment of the present invention; FIG. 5 is a schematic view of a diffractive optical module according to the first embodiment of the present invention. As shown in FIG. 4, the surface light source projection device 100 according to the first embodiment of the present invention is applied to a 3D sensing system. The surface light source projection device 100 includes a light emitting module 11 and a diffractive optical module 12. The diffractive optical module 12 includes a first diffractive optical element 121 and a second diffractive optical element 122. The first diffractive optical element 121 is provided with a first micron diffractive layer 311, the second diffractive optical element 122 is provided with a second micron diffractive layer 312, and both the first micron diffractive layer 311 and the second micron diffractive layer 312 have a plurality of micron structures 32, which are respectively micron structures 32-1 and micron structures 32-2. In addition, in the present embodiment, the diffractive optical module 12 has a substrate 33, and the substrate 33 and the micron structure 32 are integrally formed.

Specifically, as shown in FIG. 4, the micron structures 32 of the first micron diffractive layer 311 and the second micron diffractive layer 312 of the diffractive optical module 12 according to the first embodiment of the present invention are integrally formed through an etching process. The material of the diffractive optical module 12 is crystal, such as sapphire. Since sapphire is a material with high hardness and wear resistance, the sapphire can enable the diffractive optical module 12 to maintain a stable optical the properties. Moreover, as mentioned above, the lattice stacking of sapphire is also a hexagonal system, which can be matched with the micron structures 32 that are most densely arranged in hexagons to further improve the spot density of the diffraction pattern formed by the diffracted light Ld. However, the present invention not limited thereto.

Specifically, as shown in FIG. 4 and FIG. 5, the first diffractive optical element 121 according to the first embodiment of the present invention has a first upper surface 1211 and a first lower surface 1212. In the present embodiment, the first lower surface 1212 is equivalent to the light incident surface 21 of the diffractive optical element 12, and the first diffractive optical element 121 is provided with a first micron diffractive layer 311. The first micron diffractive layer 311 is provided on the first upper surface 1211. The second diffractive optical element 122 according to the first embodiment of the present invention has a second upper surface 1221 and a second lower surface 1222. In the present embodiment, the second upper surface 1221 is equivalent to the light emitting surface 22 of the diffractive optical element 12, and the second diffractive optical element 122 is provided with a second micron diffractive layer 312. The second micron diffractive layer 312 is provided on the second upper surface 1221. Specifically, in the present embodiment, the light beam L passes through the diffractive optical module 12 to form a diffracted light Ld projected outward, the light beam L enters the diffractive optical module 12 from the first lower surface 1212, and exits from the second upper surfaces 1221 to output the diffracted light Ld, but the present invention is not limited thereto.

It is worth noting that, in the present embodiment, the micron structure 32-1 of the first micron diffractive layer 311 is completely the same as the micron structure 32-2 of the second micron diffractive layer 312, so as to ensure the light spots formed by the diffracted light Ld have consistent light intensity without overlapping, and in turn to ensure the accuracy of long-distance sensing, but the present invention is not limited thereto.

Figure 6:
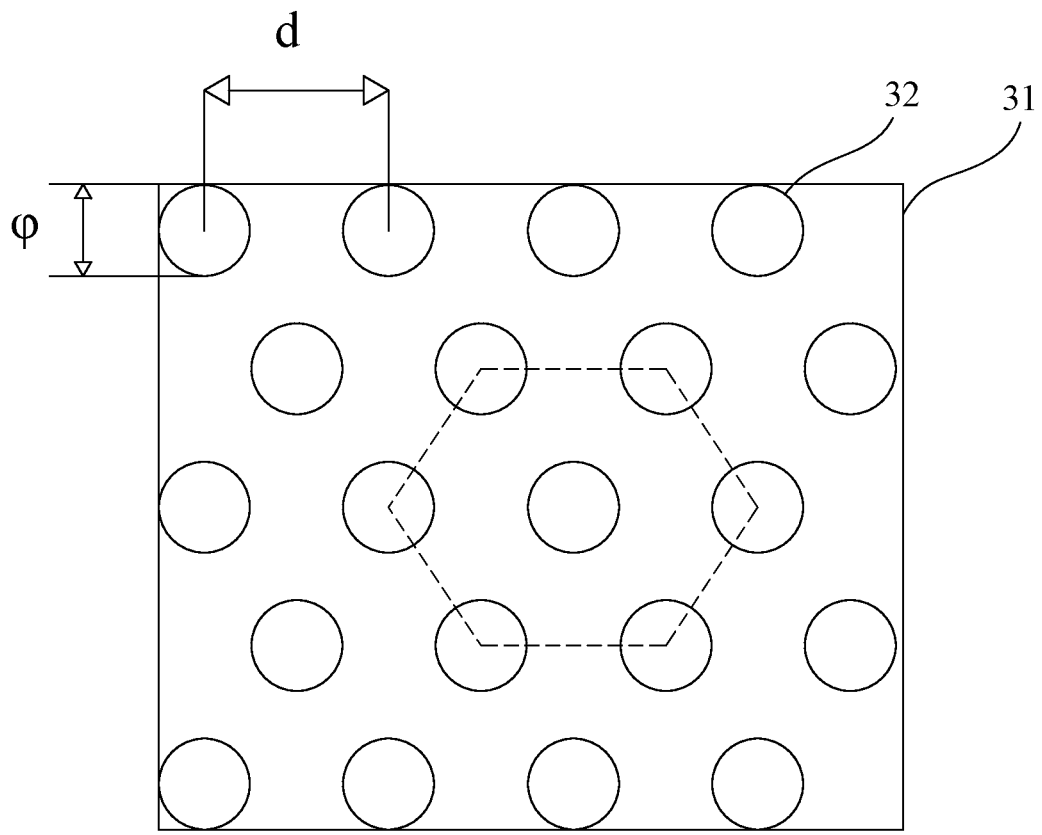
FIG. 6 is a schematic view of a micron structure according to a first embodiment of the present invention.
Figure 7:
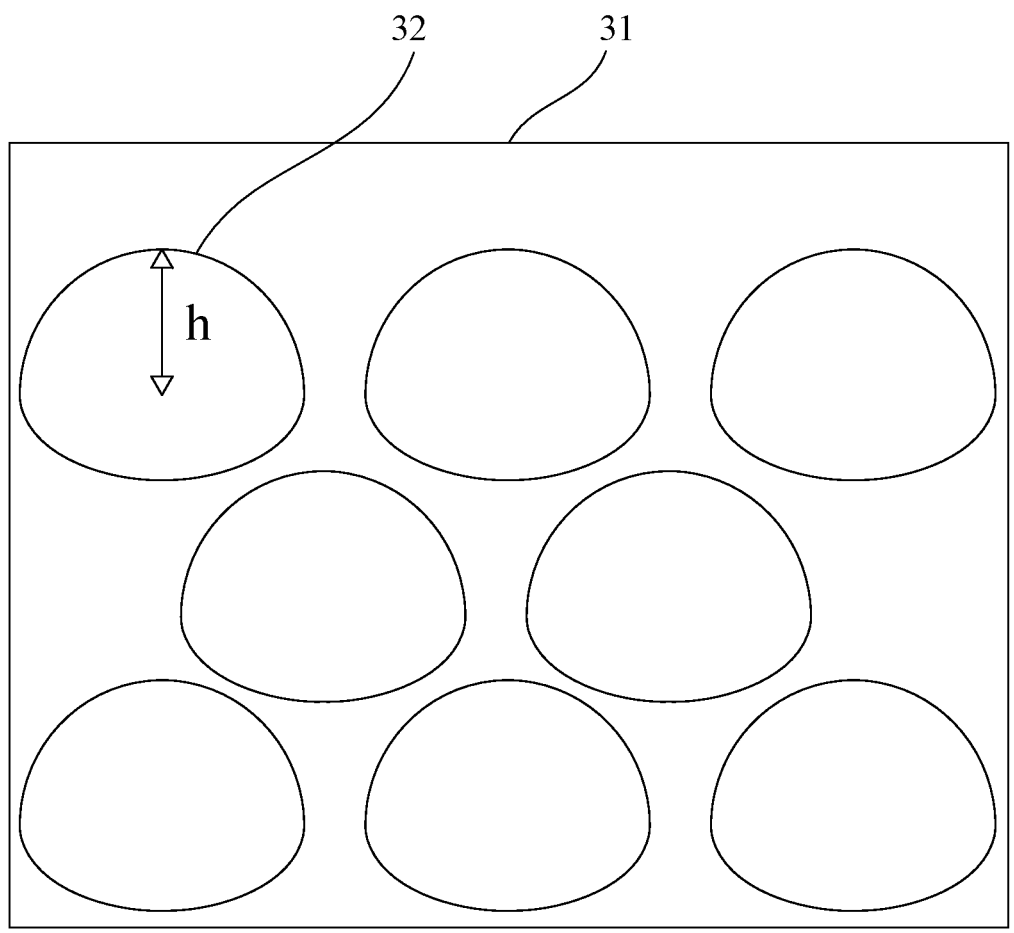
FIG. 7 is an enlarged schematic view of a micron structure according to the first embodiment of the present invention.

Specifically, refer to FIG. 6 and FIG. 7. FIG. 6 is a schematic view of a micron structure according to a first embodiment of the present invention; FIG. 7 is an enlarged schematic view of the micron structure according to the first embodiment of the present invention. As shown in FIG. 6 and FIG. 7, the micron structures 32 according to the first embodiment of the present invention are arranged in a most densely arranged hexagonal structure, and the most densely arranged hexagonal structure is an arrangement with the highest space utilization rate. The crystal material is also the most densely arranged hexagonal structure, and the micron structure 32 is cylindrical, so that the diffraction pattern formed by the diffracted light Ld has been greatly improved in both uniform spot light intensity and high spot density, so as to improve the accuracy of long-distance sensing efficacy. Specifically, in the present embodiment, the outer diameter $\phi$ of the micron structure 32 is between 5 times and 200 times the narrow half-width incident wavelength of the light beam L, and the height h of the micron structure 32 is between 0.05 times to 0.2 times the outer diameter $\phi$, the distance d between pairs of the micron structures 32 is between 0.5 times to 5 times the outer diameter $\phi$, and the surface roughness Ra of the micron structures 32 is between 0.5 nm to 50 nm. As such, the surface light source projection device 100 according to the first embodiment of the present invention, further enhance the intensity uniformity and the spot density of the light spot of the diffraction pattern formed by the diffracted light Ld, and the stability and accuracy of long-distance sensing is improved.

Figure 8:
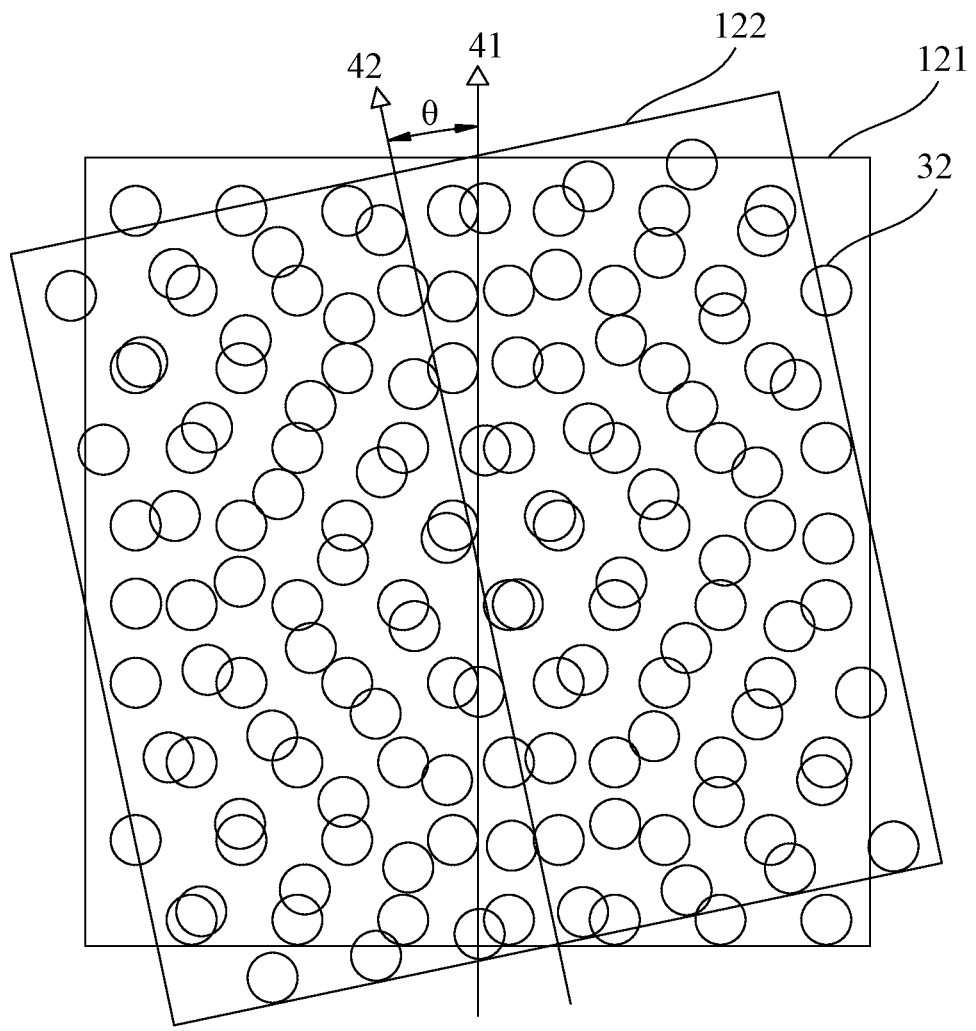
FIG. 8 is a schematic view illustrating an included angle between the first diffractive optical element and the second diffractive optical element.

Refer to FIG. 8, which is a schematic view illustrating an angle between the first diffractive optical element and the second diffractive optical element. As shown in FIG. 8, in the present embodiment, the center point of the first micron diffractive layer 311 is vertically aligned with the center point of the second micron diffractive layer 312, and the second micron diffractive layer 312 is rotated by a relative angle $\theta$ around the center point with respect to the first micron diffractive layer 311, so that there is a relative angle $\theta$ between the first direction 41 passing through a dimension of the first micron diffractive layer 311 and the second direction 42 passing through a dimension of the second micron diffractive layer 312. Preferably, in the present embodiment, when the relative angle $\theta$ is 12 degrees, the diffracted light Ld can have the best spot intensity uniformity and spot density, but the present invention is not limited thereto.

It should be further noted that in the present embodiment, the relative angle $\theta$ is ideally 12 degrees. However, the embodiment of the present invention may be subject to the error of the measuring instrument. The relative angle $\theta$ between the first direction 41 and the second direction 42 is ideally in the range of 10 degrees to 14 degrees. However, the user may choose to measure the relative angle $\theta$ with a smaller error range depending on the requirements, and the measured value may be smaller. This is only illustrative, and the present invention is not limited thereto. In addition, the relative angle $\theta$ referred to in the present invention can be defined as measure when the light beam L is in the infrared light range (for example, above 830 nm), and the first micron diffractive layer 311 and the second micron diffractive layer 312 are exactly the same; or, for the convenience of description, the relative angle $\theta$ referred to in the present invention may be defined as measured when the light beam L is at 940 nm.

Specifically, when the aforementioned method is used to adjust the relative angle $\theta$ between the first direction 41 passing through the dimension of the first micrometer diffraction layer 311 and the second direction 42 passing through the dimension of the second micrometer diffraction layer 312 to be 5 degrees, the spot distribution of the generated diffracted light Ld is a hexagonal diffraction pattern. The reason lies in that the crystal material of the first embodiment of the present invention are in a most dense arranged hexagonal structure, and some of the diffraction spots of the diffracted light Ld are overlapping each other, causing the light spot with higher light intensity in the diffraction spot to cover the light spot with lower light intensity, so that the intensity uniformity of the light spot formed by the diffracted light Ld is poor. On the other hand, when the relative angle $\theta$ between the first direction 41 at the dimension of the first micrometer diffraction layer 311 and the second direction 42 at the dimension of the second micrometer diffraction layer 312 is 12 degrees, the resulting spot distribution of the diffracted light Ld is uniform. The reason is that in the present embodiment, the relative angle θ is adjusted to change the spot position of the diffracted light Ld to reduce the overlapping of the light spots of the diffracted light Ld, thereby greatly increasing the uniformity of the intensity of the light spot of the incident light Ld and the spot density; thereby, improving the sensing signal of long-distance sensing and enhancing the contour recognition of long-distance sensing. It can be understood that the user can adjust the relative angle θ according to his needs, and the range of the relative angle θ can be between 0 degrees and 90 degrees. For example, the relative angle θ can be 5 degrees, 10 degrees, and 20 degrees, depending on what kind of diffraction pattern formed by the diffracted light Ld is more suitable, but the present invention should not be construed as being limited thereto.

Thereby, the surface light source projection device 100 according to the first embodiment of the present invention, by adjusting the relative angle θ between the first micron diffractive layer 311 and the second micron diffractive layer 312, adjusts the relative positions of the first micron structures 32 of the first micron diffractive layer 311 and the micron structures 32 of the second micron diffractive layer 312 to realize a diffraction pattern with a high density of dot matrix suitable for the time-of-flight distance sensing system.

The following provides other examples of the surface light source projection device to make possible variations more clearly understood by those skilled in the art to which the present invention pertains. Elements denoted by the same reference numerals as those of the above-described embodiments are substantially the same as those described above with reference to FIGS. 1 to 3. The same elements, features, and advantages as those of the surface light source projection device 100 will not be described again.

Figure 9:
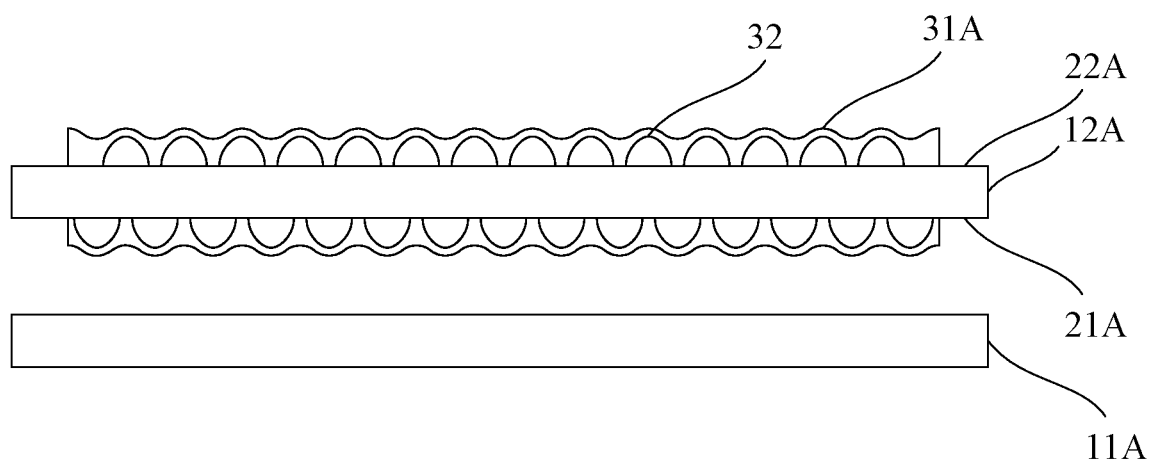
FIG. 9 is a schematic view of a diffractive optical module according to a second embodiment of the present invention.

Specifically, refer to FIG. 9, which is a schematic view of a diffractive optical module according to a second embodiment of the present invention. The difference between the surface light source projection device 100A of the second embodiment and the surface light source projection device 100 of the first embodiment is that in the second embodiment, the diffractive optical module 12A of the surface light source projection device 100A is a single substrate structure, the micron diffractive layers 31A are respectively disposed on the light incident surface 21A and the light emitting surface 22A of the diffractive optical module 12A, and the micron diffractive layers 31A may have identical micron structures 32. In the present embodiment, the micron diffractive layer 31A can be disposed on one of the light incident surface 21A and the light emitting surface 22A by etching first. After the first micron diffractive layer 31A is disposed, the diffractive optical element 12A is rotated by the relative angle 0, and then another micron diffractive layer 31A is disposed on the other one of the light incident surface 21A and the light emitting surface 22A, but the invention is not limited thereto.

Figure 10:
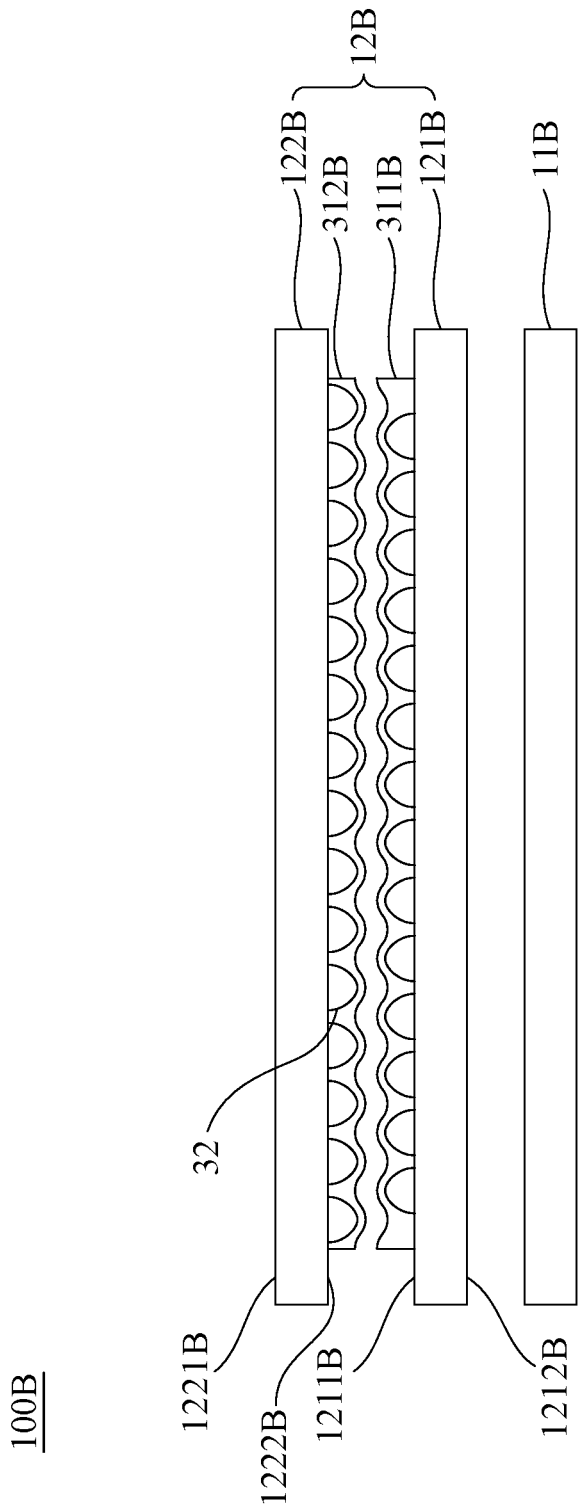
FIG. 10 is a schematic view of a diffractive optical module according to a third embodiment of the present invention.

Specifically, refer to FIG. 10, which is a schematic view of a diffractive optical module according to a third embodiment of the present invention. The difference between the surface light source projection device 100B of the third embodiment and the surface light source projection device 100 of the first embodiment is that in the third embodiment, the diffractive optical module 12B of the surface light source projection device 100B has a first diffractive optical element 121B and a second diffractive optical element 122B; the first micron diffractive layer 311B is disposed on the first upper surface 1211B of the first diffractive optical element 121B, and the second micron diffractive layer 312B is disposed on the second lower surface 1222B of the second diffractive optical element 122B. It is worth mentioning that, in the present embodiment, the micron structures 32 of the first micron diffractive layer 311B and the second micron diffractive layer 312B are exactly the same, so as to ensure that the light spot formed by the diffracted light Ld can have a consistent spot light intensity to ensure the accuracy of long-distance sensing.

It can be understood that the disposition position of the second micron diffractive layer 312B will not greatly affect the diffracted light Ld formed by the surface light source projection device 100 and the intensity uniformity and density of the light spot of the diffraction pattern formed by the diffracted light Ld, and those with ordinary knowledge in the technical field to which the present invention pertains can make various changes and adjustments based on the above examples, which will not be listed one by one here.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A surface light source projection device, comprising:
a diffractive optical module comprising a first diffractive optical element having a first upper surface and a first lower surface, a second diffractive optical element having a second upper surface and a second lower surface, a first micron diffractive layer, a second micron diffractive layer, a light incident surface and a light emitting surface; and
a light emitting module used to output a beam with collimation, the beam having an incident wavelength, and the beam being incident on the light incident surface of the diffractive optical module, and outputting a diffracted light from the light emitting surface after passing through the diffractive optical module;
wherein the first micron diffractive layer is disposed on the first upper surface of the first diffractive optical element, the second micron diffractive layer is disposed on the second diffractive optical element, the beam is incident on the diffractive optical module from the first lower surface and passes through the diffractive optical module as the diffracted light from the second upper surface, the first and second micron diffractive layers comprise a plurality of micron structures, and shapes of the micron structures are set as cones, discs or any combination of the above, and the micron structures have an outer diameter between 5 times and 200 times of the incident wavelength.

2. The surface light source projection device according to claim 1, wherein height of the micron structures is between 0.05 times and 0.2 times the outer diameter.

3. The surface light source projection device according to claim 1, wherein spacing between neighboring micron structures is between 0.5 times and 5 times the outer diameter.

4. The surface light source projection device according to claim 1, wherein surface roughness (Ra) of the micron structures is between 0.5 nm and 50 nm.

5. The surface light source projection device according to claim 1, wherein the first micron diffractive layer is arranged on the light incident surface of the diffractive optical module, and the second micron diffractive layer is arranged on the light emitting surface of the diffractive optical module.

6. The surface light source projection device according to claim 1, wherein the second micron diffractive layer is disposed on the second lower surface.

7. The surface light source projection device according to claim 1, wherein the second micron diffractive layer is disposed on the second upper surface.

8. The surface light source projection device according to claim 1, wherein the first micron diffractive layer has a first direction, and the first direction is parallel a dimension of the first micron diffractive layer; the second micron diffractive layer has a second direction, the second direction is parallel a dimension of the second micron diffractive layer; the first direction and the second direction form a relative angle, and the relative angle is between 5 degrees and 90 degrees.

9. The surface light source projection device according to claim 1, wherein the diffractive optical module further comprises a substrate, the substrate, the first and second micron diffractive layers, and the micron structures are formed by dry etching, and the material of the diffractive optical module is transparent crystal or glass.

* * * * *